(12) United States Patent
Soehnlen et al.

(10) Patent No.: US 10,889,407 B2
(45) Date of Patent: Jan. 12, 2021

(54) CONVERTIBLE PALLET FOR USE AS A CART

(71) Applicant: CREATIVE EDGE DESIGN GROUP, LTD., Canton, OH (US)

(72) Inventors: Gregory M. Soehnlen, North Canton, OH (US); Daniel P. Soehnlen, Canton, OH (US); Alexander Campana, Lorain, OH (US)

(73) Assignee: CREATIVE EDGE DESIGN GROUP, LTD., Canton, OH (US)

( * ) Notice: Subject to any disclaimer, the term of this patent is extended or adjusted under 35 U.S.C. 154(b) by 695 days.

(21) Appl. No.: 15/323,190

(22) PCT Filed: Jul. 6, 2015

(86) PCT No.: PCT/US2015/039245
§ 371 (c)(1),
(2) Date: Dec. 30, 2016

(87) PCT Pub. No.: WO2016/004435
PCT Pub. Date: Jan. 7, 2016

(65) Prior Publication Data
US 2017/0137171 A1    May 18, 2017

Related U.S. Application Data

(60) Provisional application No. 62/020,879, filed on Jul. 3, 2014.

(51) Int. Cl.
*B65D 19/42* (2006.01)
*B62B 3/02* (2006.01)
(Continued)

(52) U.S. Cl.
CPC ............... *B65D 19/42* (2013.01); *B62B 3/02* (2013.01); *B62B 5/0093* (2013.01); *B62B 5/049* (2013.01);
(Continued)

(58) Field of Classification Search
CPC .. B65D 19/42; B65D 71/0088; B62B 5/0093; B62B 5/049; B62B 11/00; B62B 3/02; B60B 33/0089
See application file for complete search history.

(56) References Cited

U.S. PATENT DOCUMENTS 2,033,207 A * 3/1936 Schultz, Jr. ......... B60B 33/0078
16/32
2,537,909 A    1/1951 Puddester
(Continued)

FOREIGN PATENT DOCUMENTS

EP        0 940 344 B1     11/2003
FR        2456011 A1 *  12/1980  ......... B60B 33/0089
(Continued)

OTHER PUBLICATIONS

PCT/US2015/039245, International Search Report and Written Opinion, dated Oct. 2, 2015.
U.S. Appl. No. 16/236,923, filed Dec. 31, 2018, Soehnlen.

*Primary Examiner* — Steve Clemmons
(74) *Attorney, Agent, or Firm* — Fay Sharpe LLP

(57) ABSTRACT

A convertible pallet alternately displays and ships/transports associated product received thereon is disclosed herein. The pallet includes a substantially planar support member for receiving the associated product thereon. At least first and second wheels are mounted to the pallet. A convertible support surface is movably mounted to the pallet, the convertible support surface having (i) a first position where the convertible support surface receives loads imposed on the upper surface and transfers the loads directly to an (Continued)

associated surface, and (ii) a second position where the wheels extend outwardly from the lower surface for engagement with the associated surface so that loads imposed on the upper surface are transferred to the associated surface through the wheels and for converting the pallet into a movable cart.

11 Claims, 9 Drawing Sheets

(51) Int. Cl.
*B62B 5/00* (2006.01)
*B62B 5/04* (2006.01)
*B65B 11/00* (2006.01)
*B65D 19/00* (2006.01)
*B65D 71/00* (2006.01)
*B65D 71/06* (2006.01)
*B65D 85/80* (2006.01)

(52) U.S. Cl.
CPC .......... *B65B 11/00* (2013.01); *B65D 19/0024* (2013.01); *B65D 71/0088* (2013.01); *B65D 71/06* (2013.01); *B65D 85/80* (2013.01); *B65D 2519/00024* (2013.01); *B65D 2519/00273* (2013.01); *B65D 2519/00288* (2013.01); *B65D 2519/00323* (2013.01); *B65D 2519/00333* (2013.01); *B65D 2519/00781* (2013.01)

(56) References Cited

U.S. PATENT DOCUMENTS

| | | | | |
|---|---|---|---|---|
| 2,759,738 A | * | 8/1956 | Reiter | A47B 31/00 280/62 |
| 3,044,577 A | | 7/1962 | Lotz | |
| 3,090,634 A | * | 5/1963 | Herbert | A47D 1/08 280/31 |
| 3,216,531 A | * | 11/1965 | Hutchinson | B60P 1/02 188/5 |
| 3,217,839 A | * | 11/1965 | Watkins | B60B 33/0078 188/4 R |
| 3,231,050 A | * | 1/1966 | Belyeu | B62B 5/049 188/5 |
| 3,247,931 A | * | 4/1966 | Bunn | B62B 5/049 188/5 |
| 3,710,895 A | | 1/1973 | Freedman | |
| 4,020,959 A | * | 5/1977 | Livesay | B60B 33/0089 414/508 |
| 4,073,369 A | * | 2/1978 | Nordskog | B60T 1/14 188/32 |
| 4,576,391 A | | 3/1986 | Gerstner | |
| 4,886,286 A | | 12/1989 | Whorton, III | |
| 5,035,445 A | * | 7/1991 | Poulin | B60S 9/06 188/5 |
| 6,073,786 A | | 1/2000 | McCorkle, Jr. | |
| 6,183,405 B1 | * | 2/2001 | Schurig | B60B 33/0039 16/18 B |
| 6,371,496 B1 | * | 4/2002 | Balolia | B60T 1/14 188/19 |
| 7,537,222 B2 | | 5/2009 | Hadar | |
| 8,016,300 B2 | * | 9/2011 | Cramer | B62B 5/049 137/899.3 |
| 9,045,253 B2 | * | 6/2015 | Hacko | B62B 5/0433 |
| 9,611,071 B2 | * | 4/2017 | Baltz | B65D 19/44 |
| 2007/0102599 A1 | | 5/2007 | Lin | |
| 2007/0108083 A1 | | 5/2007 | Sonon | |
| 2010/0005620 A1 | * | 1/2010 | Gray | B60B 33/0057 16/47 |

FOREIGN PATENT DOCUMENTS

| | | | | |
|---|---|---|---|---|
| FR | 2500797 A1 | * | 9/1982 | ........... B60B 33/021 |
| GB | 1122055 A | * | 7/1968 | ............. B62B 5/049 |
| GB | 2099693 A | * | 12/1982 | ......... B60B 33/0078 |

* cited by examiner

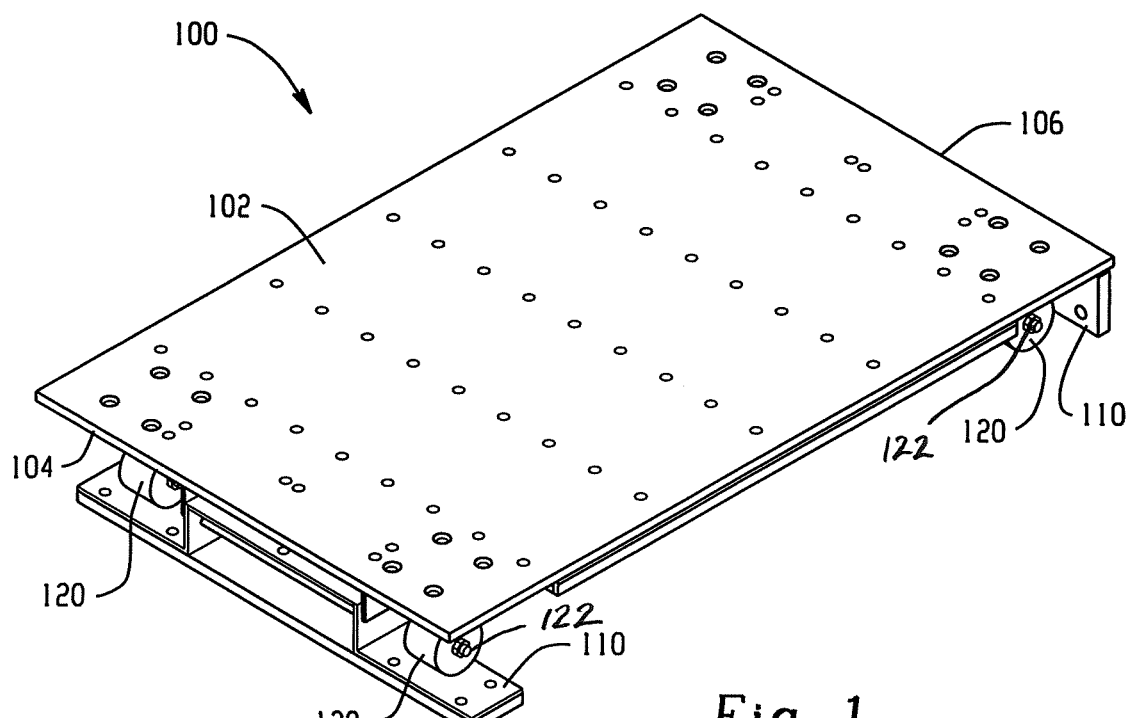
Fig. 1
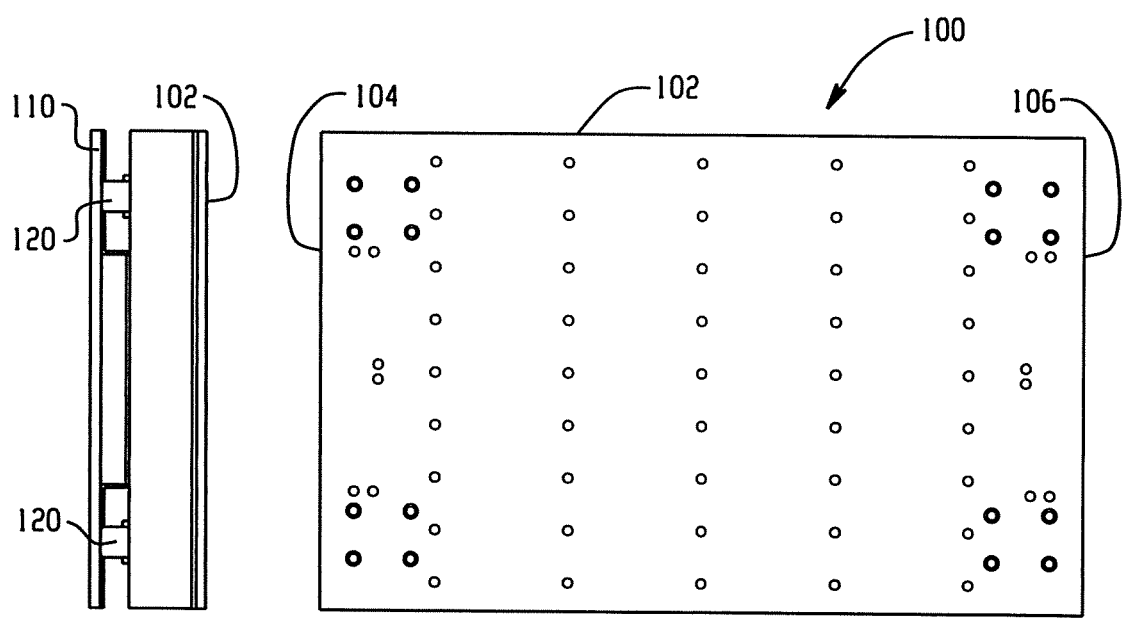
Fig. 3
Fig. 2

CONVERTIBLE PALLET FOR USE AS A CART

This application claims the priority benefit of U.S. provisional application Ser. No. 62/020,879, filed Jul. 3, 2014, the disclosure of which is incorporated herein by reference.

BACKGROUND

The present disclosure relates to an apparatus and method for facilitating transport of product, such as bottled milk. More particularly, the disclosure relates to a convertible pallet used to support a stacked array of product on an upper surface thereof whereby the pallet may be selectively lifted, for example by a lift assembly such as a forklift or pallet jack, so that the pallet can be converted from a stationary pallet to a movable pallet, or vice versa, and allow product supported on the pallet to be easily shipped, transported through a store, and positioned in a display area. The disclosure may find application in related environments and applications.

It is now common to package bottled milk on pallets, either with or without milk crates or containers. However, it is difficult to use and move a fully loaded pallet with, for example, 270 milk bottles, through the store because of the footprint associated with the full pallet. Many stores do not use motorized forklifts because of the size, noise, and smell associated with use of a forklift in a store environment. Likewise, lifting and transporting loaded pallets with a pallet jack through the store still does not overcome the size constraint issue.

Consequently, many stores still desire to transport milk delivered from the dairy plant on bossies. A bossy is a frame-like structure having two or more caster wheels for ease of movement in the store. The bossy has a smaller footprint than a full pallet unloaded from the transport trailer into the back room of the store, and then manually pushed around the store from the back room storage area to the display case. Typically, the bottled milk is left on the bossy in the display case so that approximately 80 gallons of bottled milk are available on a single bossy in the display case.

When used in this manner, the empty bossies still need to be returned or shipped back to the dairy plant, the bossies need to be cleaned, and special loading equipment is required for loading and unloading empty bossies onto trucks. Bossy carts are expensive (typically constructed from stainless and may cost approximately $750 each), and heavy (may weigh on the order of 200 to 300 pounds each when empty).

Alternatively, pallets of bottled milk are unloaded from a truck into a back room, and the bottled milk is sometimes manually transferred from the pallets to a bossy in the store back room. Even though the bossy contains multiple shelves, it takes three or more trips to transport the bottled milk stored on a full pallet (224 bottles) on a bossy (that stores 80 gallon or 3 liter bottles) to a retail store display where the bottled milk is accessed by the consumer.

As will be appreciated, a need exists for improving transport of product such as bottled milk from a dairy, to a back room of a store, and to the display case.

SUMMARY OF THE DISCLOSURE

A convertible pallet for alternately displaying and transporting associated product received thereon is disclosed herein. The pallet includes a substantially planar support member having an upper surface for receiving the associated product thereon and a lower surface configured to receive an arm from an associated lift assembly. At least first and second wheels are mounted to the lower surface. A convertible support surface is movably mounted to the pallet, the convertible support surface having (i) a first position where the convertible support surface receives loads imposed on the upper surface and transfers the loads directly to an associated surface, and (ii) a second position where the wheels extend outwardly from the lower surface for engagement with the associated surface so that loads imposed on the upper surface are transferred to the associated surface through the wheels and for converting the pallet into a movable cart.

The convertible support surface includes a hinge mounting assembly for selectively pivoting the convertible support surface relative to the support member.

The hinge mounting assembly includes a retaining member for holding the convertible support surface in one of the first and second positions.

The hinge mounting assembly includes a slot on one of the planar support member and convertible support surface, and extension member on an other of the planar support member and convertible support surface and selectively received in the slot.

The retaining member includes one of a threaded member or a biased member for tightening the convertible support surface to the planar support surface.

The convertible support surface includes first and second flanges hingedly mounted on opposite ends of the planar support member.

In the first position, the flanges are disposed in substantially parallel relation with the upper surface of the planar support member.

In the first position of the flanges, the wheels are located between the flanges and the planar support member.

In the first position, the flanges are disposed beneath the wheels.

In the first position of the flanges, the wheels are located between the flanges and the planar support member.

In the second position, the flanges extend substantially perpendicular to the upper surface of the planar support member.

In the second position of the flanges, the wheels extend outwardly from the planar support member a greater distance than the flanges.

A method of transporting milk includes providing a pallet configured to receive an arm from an associated lift assembly. At least first and second wheels are selectively mounted on the pallet. A convertible support member has a first position where the convertible support member extends from the pallet and transfers load forces on the pallet directly to an associated surface, and a second position where the support member is moved out of the way and the wheels engage the associated surface so that loads imposed on the upper surface are transferred to the associated surface through the wheels and for converting the pallet into a movable cart.

The method further includes loading milk bottles in a stacked array on the pallet with the convertible support member in the first position.

The method further includes wrapping the stacked array of milk bottles on the pallet.

The method includes positioning the convertible support member to the second position so that the pallet with milk bottles stacked thereon may be transported on the pallet wheels without removal from the pallet.

The method includes using a lift assembly to raise the pallet from the associated surface and thereby change a position of the convertible support member from one of the first and second positions to the other of the first and second positions.

The method further includes providing shelves above the loaded pallet in a display case.

A primary benefit of the present disclosure relates to improved movement of product through a store.

Another advantage resides increased efficiencies associated with the convertible pallet.

Still another benefit is associated with the ability to use the same assembly to ship, transport, and display product.

Still other benefits and advantages of the present disclosure will become more apparent from reading and understanding the following detailed description.

BRIEF DESCRIPTION OF THE DRAWINGS

FIG. 1 is a perspective view of a preferred embodiment of a convertible pallet.

FIG. 2 is a plan view of the convertible pallet of FIG. 1.

FIG. 3 an elevational view of the convertible pallet taken generally from the left-hand end of FIG. 2.

DETAILED DESCRIPTION

Figure 4:
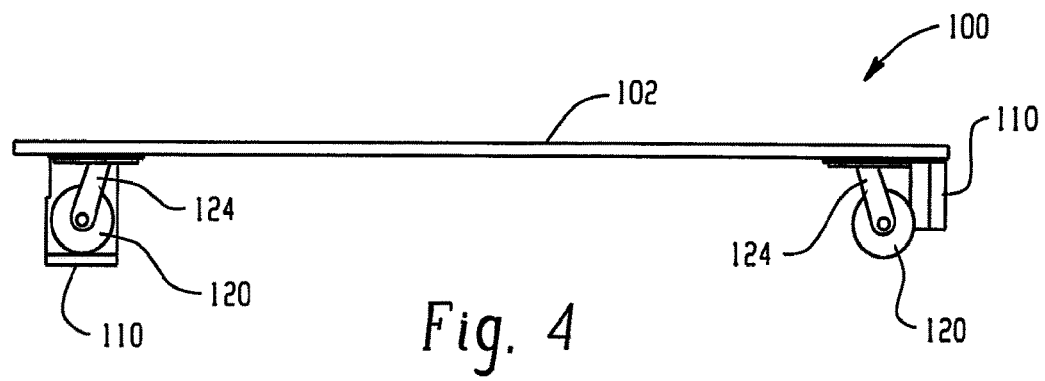
FIG. 4 an elevational view of the convertible pallet taken from the front of FIG. 2.

Turning to FIGS. 1-5, there is shown a convertible pallet 100 that includes a support surface 102, shown here as having a generally rectangular conformation. In one embodiment, the support surface 102 has perimeter dimensions that closely approximate one-half the surface area of a conventional pallet for reasons which will become more apparent below. However, this does not preclude other conformations or dimensions that may find particular application within the dairy/store industry or use outside of the dairy industry. The support surface 102 forms a rigid planar surface adapted to receive product (as will be discussed further below with respect to bottled milk) on the surface. As is known, the product can be arranged in a stacked array on the support surface in a manner generally shown and taught in commonly owned U.S. Pat. Nos. 6,068,161 and 6,591,986, the disclosures of which are expressly incorporated herein by reference.

A convertible support surface is provided on the pallet, namely, at first and second ends 104, 106 of the support surface 102 are provided selectively movable flanges or slats 110. Since each flange 110 is preferably the same design and construction, description of one flange is equally applicable to the other. The flange 110 is mounted to the support surface 102 for movement between first and second positions. A first or support position is shown at the left-hand end 104 in FIG. 1 as a generally horizontal orientation where the flange is positioned beneath rollers or wheels 120. In this first position, the convertible support surface or flange 110 receives loads imposed on the upper surface of the pallet and transfers the loads directly to an associated surface (ground or floor). In a second position shown at the right-hand end 106 of FIG. 1, the convertible support surface or flange 110 is disposed in a generally vertical orientation extending downwardly from the support surface 102 but having a dimension whereby the flange in the second position terminates above the lowermost surface of the wheel 120. In this manner, when both flanges 110 are disposed in the first, storage position, the pallet 100 is stationary and is used in substantially the same manner as a conventional pallet (i.e., it supports product on the upper surface and loads are transferred to the floor or ground surface). When both flanges 110 are oriented in the second, movable position, the pallet 100 is transformed into a wheeled support cart so that product stored thereon can be easily moved (i.e., rolled) over the ground surface.

Each wheel 120 may be a fixed axis or a caster-type wheel that can rotate about a vertical axis in a manner well known in the art. For example, each wheel 120 is mounted for rotation about a horizontal axis or axle 122 supported by first and second support arms 124. Generally speaking, the wheel structure and operation (whether it be a fixed axis or caster-type wheel) is conventional so that further discussion is deemed unnecessary to a full and complete understanding of the present disclosure.

To reposition the flanges 110 between the first and second positions, and vice versa, the entire pallet 100 is raised off the ground surface. For example, a conventional lift assembly such as a forklift or pallet jack (not shown) is used. A support arm(s) such as tines or forks of the lift assembly are advanced beneath the support surface 102 between the ends 104, 106 and the entire pallet 100 raised a predetermined height off the ground. That predetermined height is sufficient to allow the orientation or position of the flanges 110 to be advantageously changed from the first (support) position to the second (movable) position, and vice versa. The forklift or pallet jack are not shown, however they are conventional structures that are well known to one of ordinary skill in the art.

Figure 5:
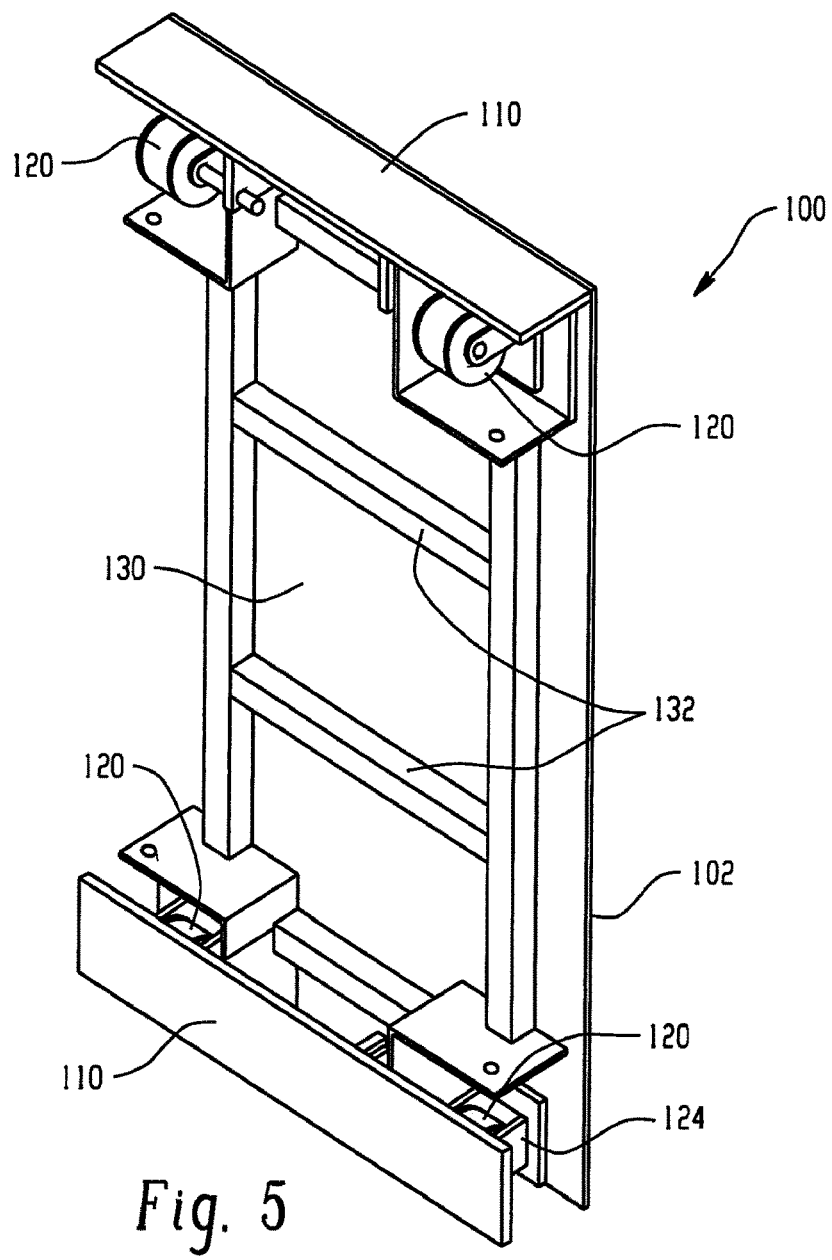
FIG. 5 is a perspective view of the underside of the convertible pallet with one end in a first, stationary position and the other end in a second, movable position.

As perhaps best illustrated in FIG. 5, an underside 130 of the support surface 102 may be reinforced with one or more ribs or reinforcing members 132 to provide added strength to the pallet 100. Preferably, the reinforcing members 132 have a minimal height so as not to interfere with the orienting or operation of the flanges 110 in the second or vertical position.

Once the flanges 110 are oriented in the same manner, i.e. either in the horizontal, storage position or in the vertical, movable position, the pallet 100 is lowered so that the pallet is either stationary (when the flanges are in the horizontal/ storage position) or the pallet is movable (when the flanges are in the vertical/movable position).

Figure 6:
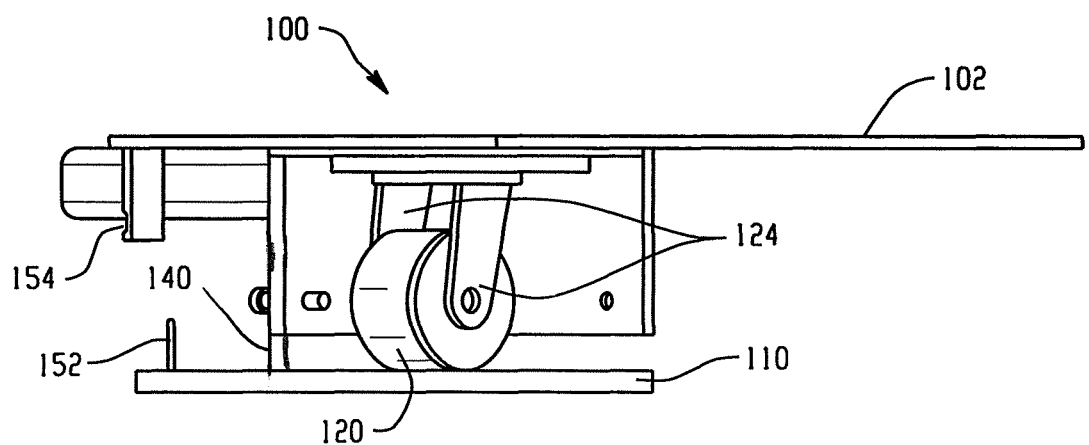
FIG. 6 is an enlarged view of a roller/wheel disposed on the flange disposed in a horizontal position.
Figure 7:
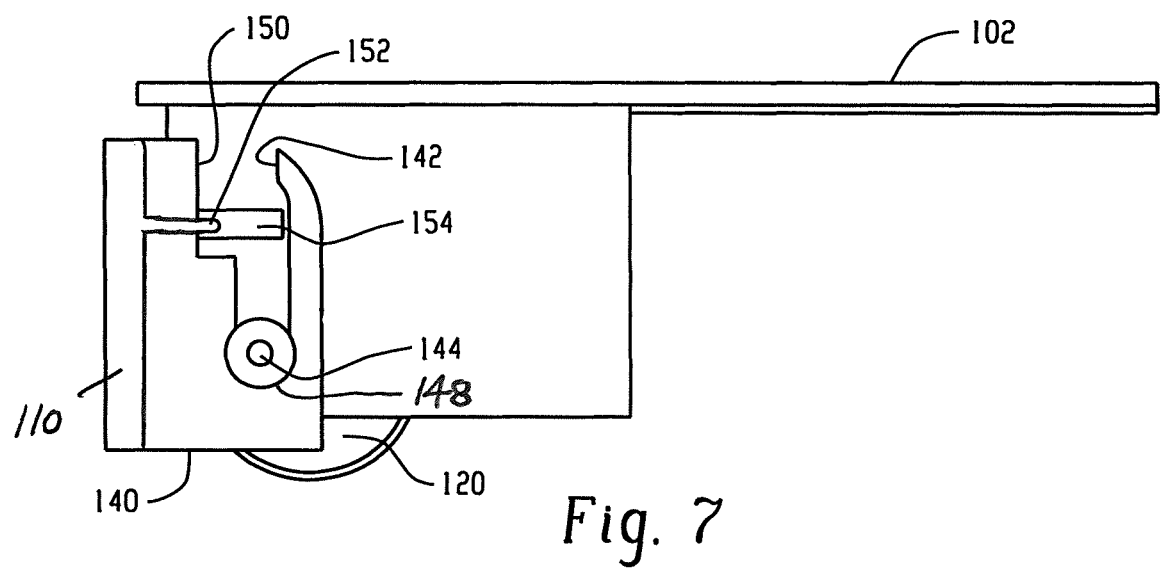
FIG. 7 is an enlarged elevational view of a roller/wheel with the flange oriented in a vertical position.

With continued reference to FIGS. 1-5, and additional reference to FIGS. 6 and 7, one preferred design structure or assembly for alternate positioning of the flanges 110 is shown. Particularly, an orienting plate(s) 140 is provided on the flange 110 and the plate includes an elongated groove 142 that receives a guide pin 144 that has a reduced diameter stem portion 146 and an enlarged head 148 (FIG. 6). The stem portion 146 cooperates with the plate 140 and limits the rotational movement of the flange 110 along the path defined by the groove 142. The head 148 of the pin 144 retains the plate 140 in position (e.g., the retaining member includes one of a threaded member or a biased member for tightening the convertible support surface to the planar support surface). Thus as shown in FIG. 7, the pin 144 is disposed adjacent one end of the groove 142 to maintain the flange 110 in the vertical position so that the wheels 120 engage the ground surface and the pallet 100 can be maneuvered. In the orientation shown in FIG. 6, on the other hand, the pin 144 is disposed in the other end of the slot 142, and preferably along shoulder 150 (FIG. 7) to orient the flange 110 in the first, storage position beneath the wheel 120 whereby the pallet 100 is stationary. Abutment between the pin 144 and the shoulder 150 in the orienting plate 140 prevents inadvertent movement of the flange 110 and ensures the user that the flange has been properly positioned.

In addition, a finger 152 and recess or groove 154 are provided to also aid in holding the flange in the vertical orientation (see FIG. 7).

Figure 9:
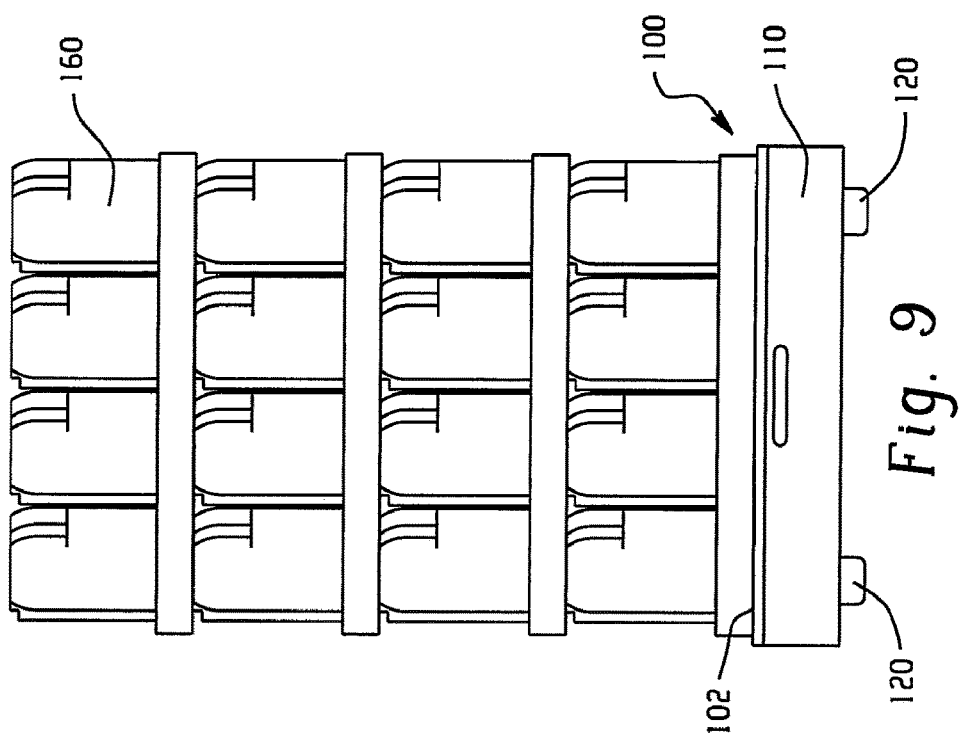
FIG. 9 is an end view of the loaded convertible pallet of FIG. 8.
Figure 8:
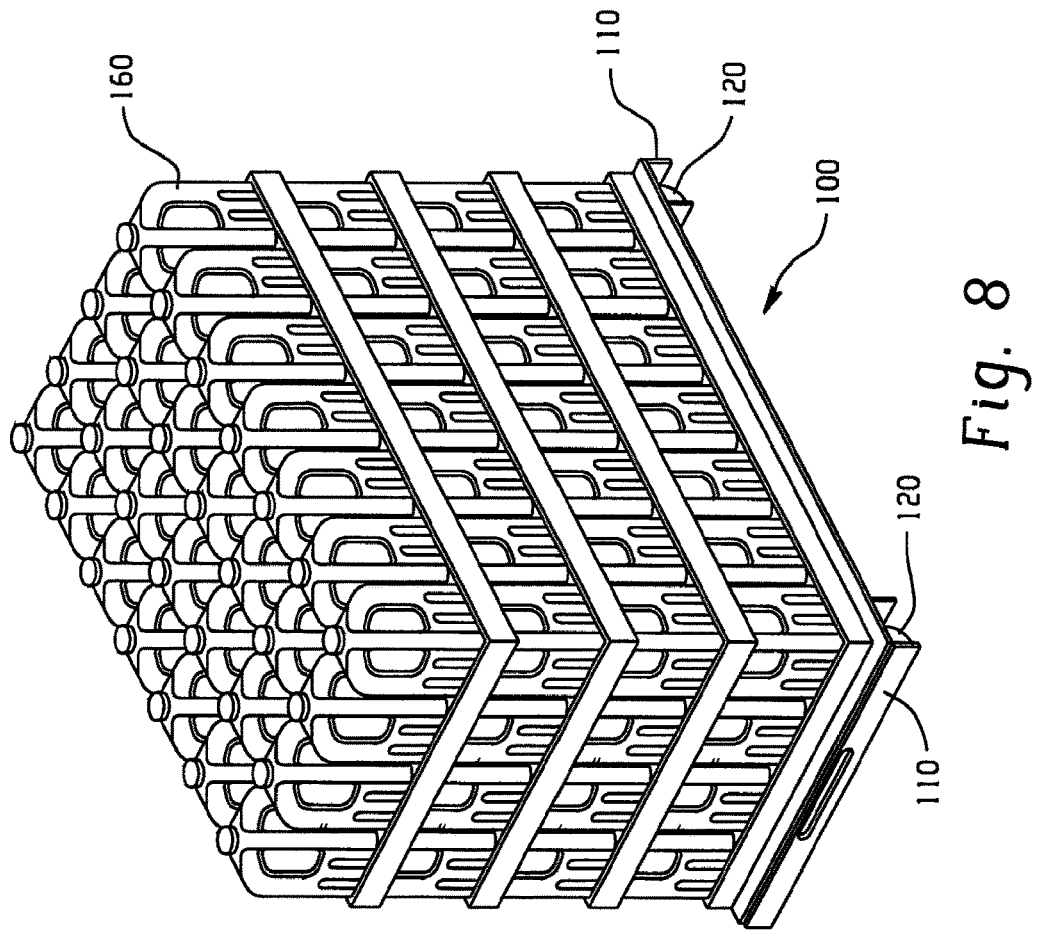
FIG. 8 is a perspective view of the convertible pallet loaded with product such as a stacked array of milk bottles.

FIGS. 8 and 9 show products 160 stacked on the pallet 100. Specifically, product shown here is bottled milk, for example, in stackable bottles of the type shown and described in the commonly owned, referenced patents. Here, each layer holds twenty-eight bottles on a pallet 100 that is dimensioned as a one-half conventional pallet. Since there are four layers, a total of one-hundred-twelve milk bottles are received on the pallet. The entire stacked array may be held together by a plastic wrap or otherwise conveniently held together in some other manner. Because the aisles and room to maneuver in a retail store can be limited, it is undesirable to transport an entire pallet with stacked product thereon through the store.

Figure 10:
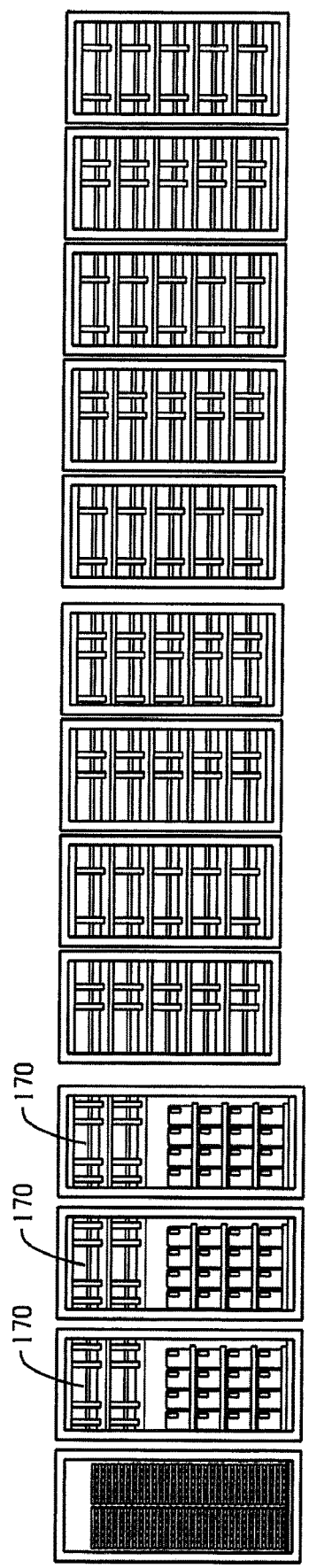
FIG. 10 shows a display case with bossies illustrated at one end and use of the convertible pallet for displaying product adjacent thereto.
Figure 11:
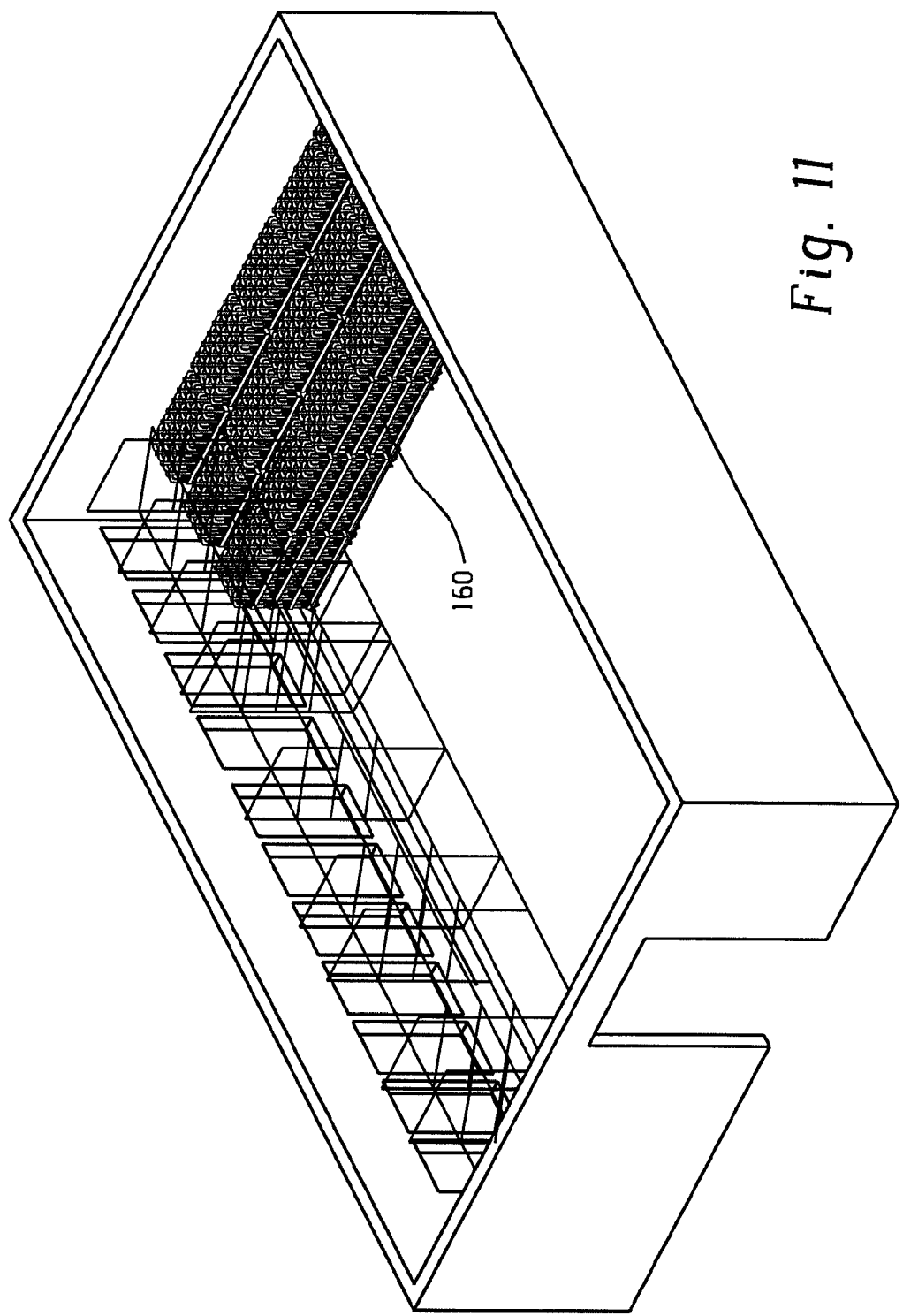
FIG. 11 is a perspective view of the display case taken generally behind the display wall.
Figure 12:
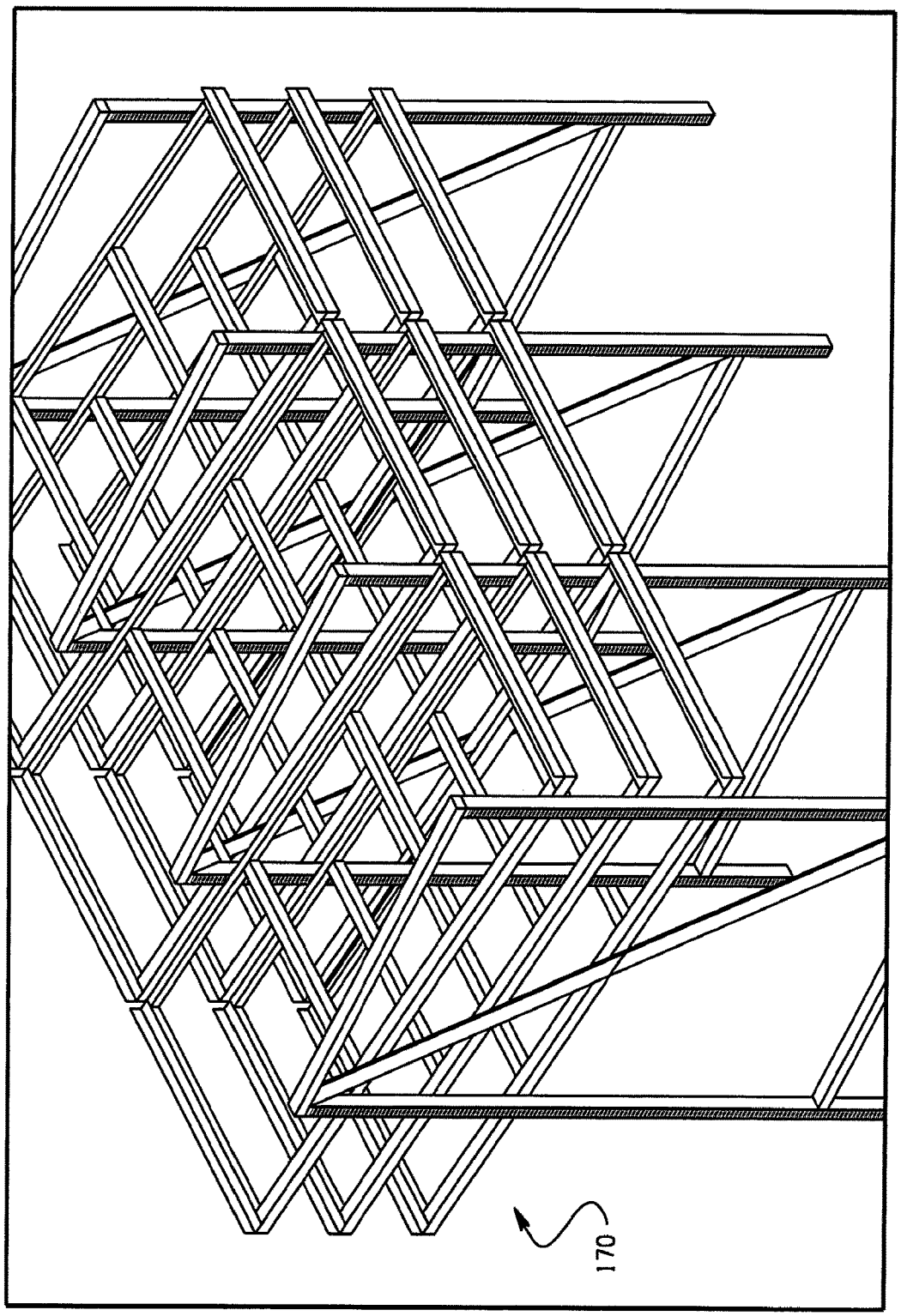
FIG. 12 is a perspective view of a support assembly used in association with the convertible display pallet.
Figure 13:
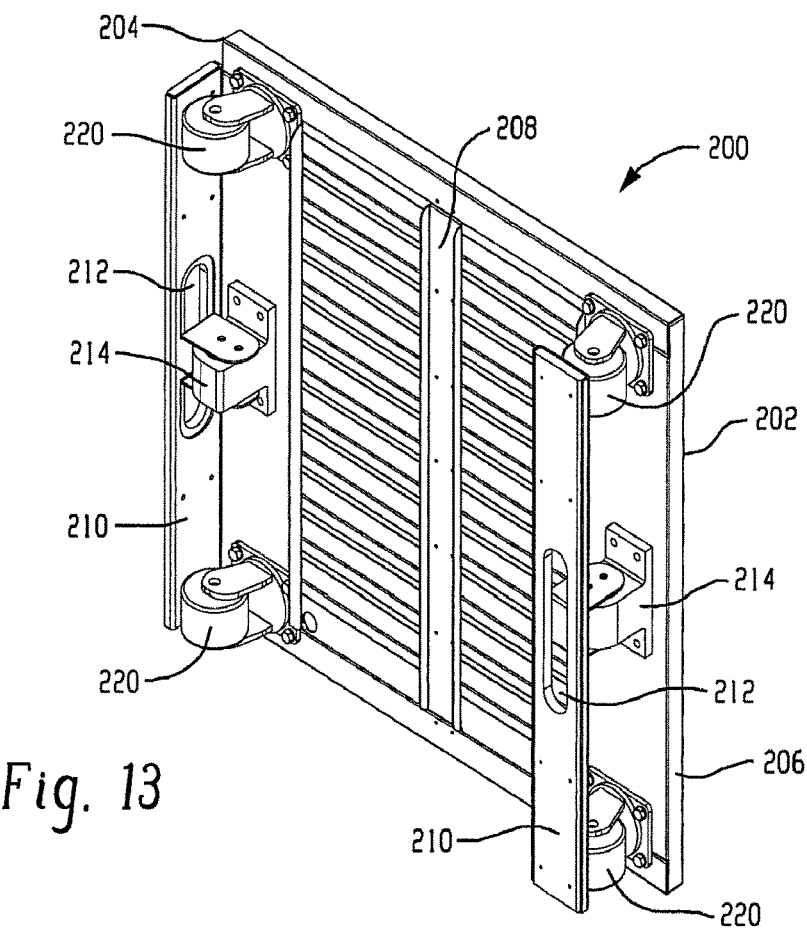
FIG. 13 is a perspective view of a convertible pallet generally illustrating an underside thereof.
Figure 14:
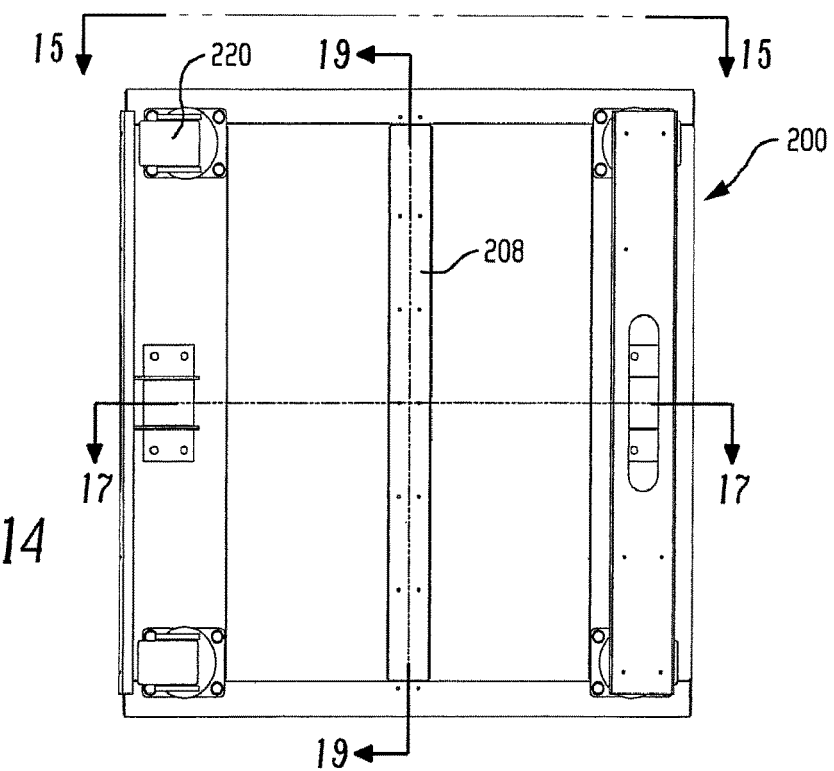
FIG. 14 is a bottom plan view of the convertible pallet of FIG. 13.
Figure 15:
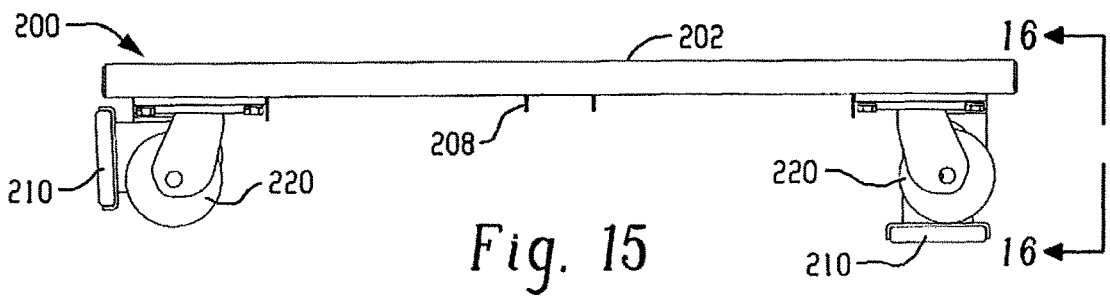
FIG. 15 is an elevational view of the convertible pallet taken generally along the line 15-15 of FIG. 14.
Figure 16:
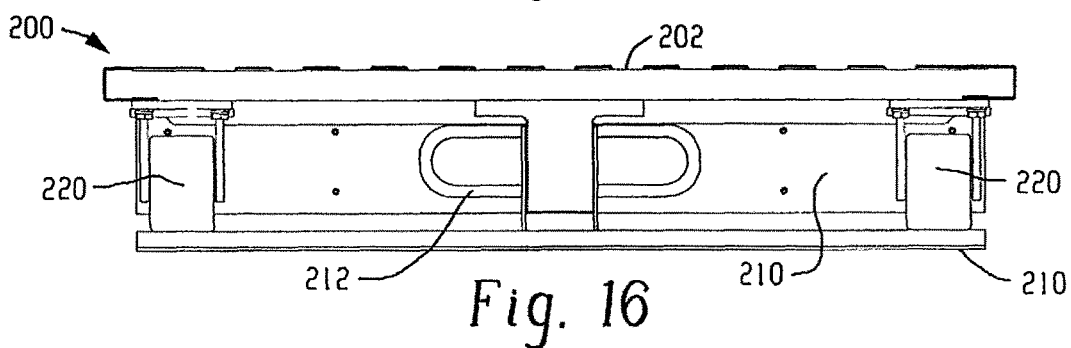
FIG. 16 is an elevational view taken generally along the line 16-16 of FIG. 15 (i.e. from the right-hand end of FIG. 15).

FIGS. 10-12 illustrate some of the advantages of the convertible pallet 100. Namely, bossies are usually transported into position that the display case (left-hand end of the display shown in FIG. 10, or at the right-hand end when viewed from the rear of FIG. 11). Even when fully loaded, an individual bossy only carries eighty, one gallon or three liter bottles whereas the convertible pallet shown in FIG. 8 carries twenty-eight filled bottles in each layer for a total of one hundred twelve filled bottles with four layers disposed on the illustrated convertible pallet 100. Thus, substantially more product 160 can be conveniently transported and displayed. Moreover, the bossy has a greater height than the corresponding half pallet 100. Thus, additional display shelving or product storage can be provided over the convertible pallet. Less trips are required to transport product to the display. Less trips are required to remove the empty pallet 100 than would be required for the same number of product if the bossies are used. Other product can be conveniently displayed over the pallet 100 in shelving 170 (FIGS. 10-12). Further, no specialized equipment for handling the bossies, all at a reduced cost to manufacture, clean, replace, etc. in addition, the convertible pallets 100 may be stacked one atop another when there is no product supported thereon.

FIGS. 13-20 illustrate a slightly different version of a convertible pallet of the present disclosure. For ease of description and understanding, like reference numerals in the "200" series will be used to describe like components, e.g convertible pallet 100 in FIGS. 1-12 will now be described as convertible pallet 200 in FIGS. 13-20, and new reference numerals will describe new components. The convertible pallet 200 has a planar support surface 202. Again, the convertible pallet 200 is shown as having a generally rectangular or square configuration, although other configurations or dimensions may be used without departing from the scope and intent of the present disclosure. The support surface 202 may be formed of a rigid and lightweight material such as aluminum and may have a corrugate construction for added strength and rigidity (see corrugate bottom of support surface in FIG. 13) and/or may include an additional lateral support member 208 for stability.

Opposite ends 204, 206 of the convertible pallet 200 include selectively movable flanges 210. Each flange 210 may be individually pivoted through approximately 90° when the convertible pallet 200 is raised from the floor by a lift assembly (not shown). Central openings 212 are provided in each of the flanges 210, and each flange is centrally mounted to a support structure 214 that extends from an underside of the support surface 202 for rotation through approximately ninety degrees between the horizontal and vertical positions. A first or support position (horizontal) of the flange 210 is shown on the right-hand side of FIGS. 13-15 and 17, while the second or movable position (vertical) of the flange is illustrated on the left-hand side of these figures. When the flanges 210 are in the first or support position, loads are transferred from the support surface 202, through the support structure 214, and to the flanges 210 which are supported on the ground or floor surface. On the other hand, when the flanges 210 are oriented in the second or movable position, loads are transferred from the support surface 202 to the wheels 220 which are free to roll along the ground or floor surface.

Rotatable, caster wheels 220 are also mounted to an underside of the support surface 202. As noted in the prior embodiment, preferably each wheel 220 can rotate relative to the support surface 202 about a vertical axis in a manner well known in the art for ease of steering and maneuverability of the convertible pallet 200.

To reposition the flanges 210, a lift assembly (not shown) such as a forklift, pallet jack, etc. has support arms that can be advanced beneath the support surface 202 whereby the convertible pallet 200 can be raised or lowered relative to the ground or support surface. In the raised position of the convertible pallet 200, an operator can then manually rotate the flanges 210 to the other position, and then the support arms lowered to lower the convertible pallet 200 as needed so that the pallet is either stationary (when the flanges are in the horizontal/storage position) or movable (when the flanges are in the vertical/movable position).

Figure 17:
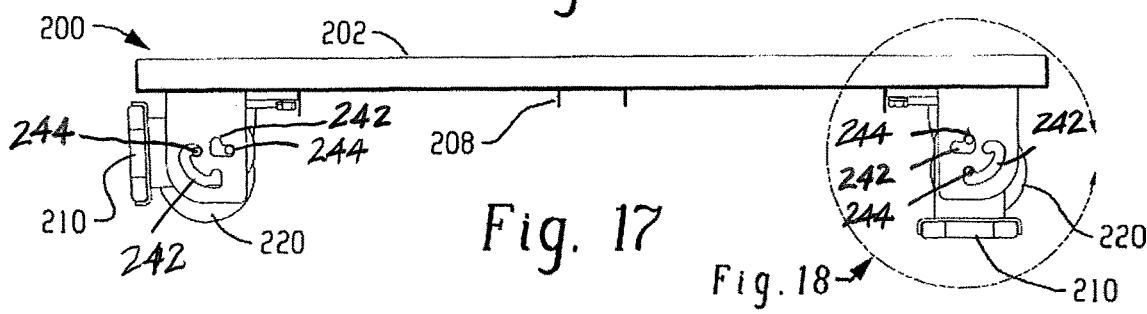
FIG. 17 is a cross-sectional view taken generally along the line 17-17 of FIG. 14.
Figure 19:
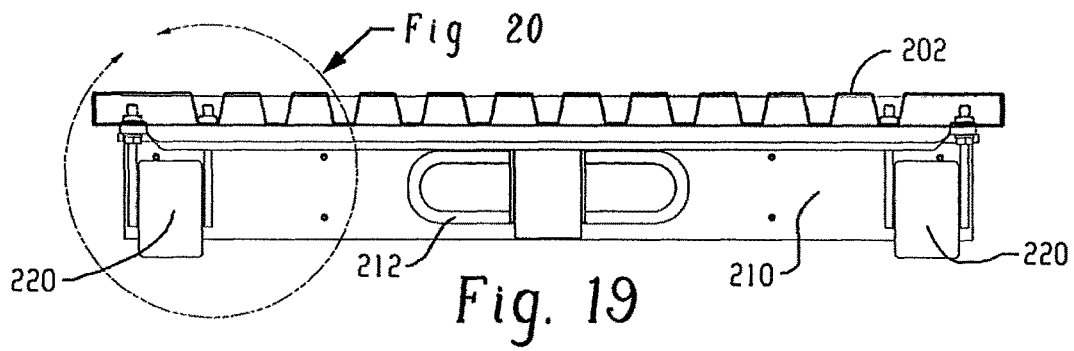
FIG. 19 is a cross-sectional view taken generally along the line 19-19 of FIG. 14.
Figures 18, 20:
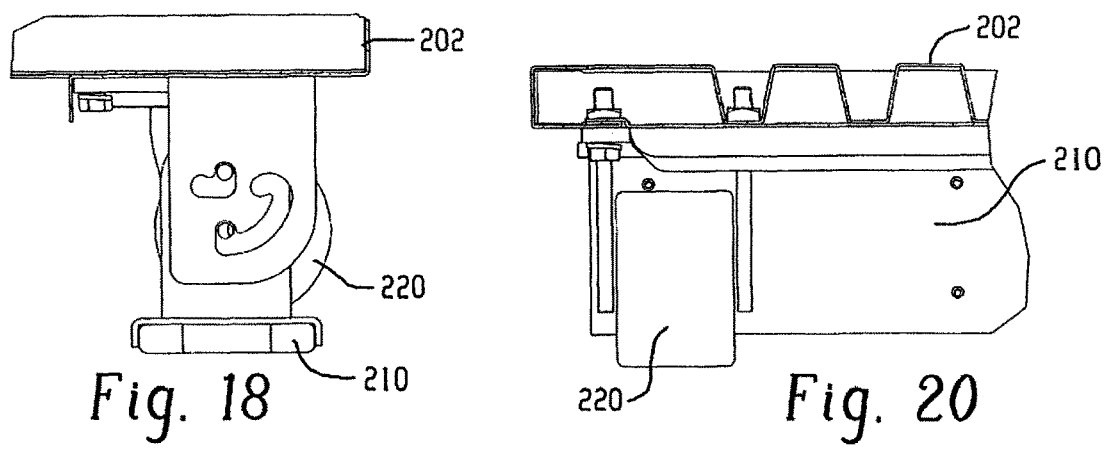
FIG. 18 is an enlarged view of the encircled region of FIG. 17.
FIG. 20 is an enlarged view of the encircled region of FIG. 19.

As perhaps best represented in FIG. 17, a pair of pins 244 cooperate with associated slots or grooves 242 associated with the support structure 214 of the flanges. The grooves 242 include stop positions at either end to receive pins 244 and orient the associated flanges 210 between the vertical and horizontal positions i.e., the first and second positions of the flanges.

As will be appreciated, in the production environment, when the convertible pallet 200 is used primarily in the pallet (stationary) mode, the floor surfaces are typically not as smooth and the wheels 220 would be subject to degradation. Thus in the production plant, it is likely that the flanges 210 would remaining in the horizontal position and any movement of the convertible pallet 200 with or without loads thereon would be such as to protect the wheels 220 from harsh handling or traffic. On the other hand, in the retail environment where the floors are generally smoother, the flanges 210 would be rotated to the vertical, movable position and the convertible pallet 200 (either loaded or unloaded) could be easily rolled across the floor surface. This adds substantial useful life to the pallet 200 since the wheels 220 are primarily exposed to use only in those environments with smooth floors.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

What is claimed is:

1. A convertible pallet for supporting and transporting associated product received thereon, the pallet comprising:
    a substantially planar support member having an upper surface for receiving the associated product thereon and a lower surface configured to receive an arm from an associated lift assembly;
    at least first and second wheels mounted to the lower surface;
    a convertible support surface movably mounted to at least one of the upper and lower surfaces, the convertible support surface having (i) a first position where the convertible support surface receives loads imposed on the upper surface and transfers the loads directly to an associated surface, and (ii) a second position where the wheels extend outwardly from the lower surface for engagement with the associated surface so that loads imposed on the upper surface are transferred to the associated surface through the wheels and for converting the pallet into a movable cart; and
    first and second guide pins configured for operative receipt in first and second grooves, respectively, the first guide pin extending from one of the support member and convertible support surface, and the first and second grooves provided on an other of the support member and convertible surface, wherein the first and second grooves are dissimilarly shaped, the first groove is L-shaped and the second groove includes an arcuate region between the ends, and each end of each of the first and second grooves includes an offset that receives the guide pin when the convertible support surface is oriented in one of the first and second positions, and the first guide pin configured for receipt in the first groove and the second guide pin configured for receipt in the second groove whereby ends of the first and second grooves define stop positions for the respective first and second positions of the convertible surface.

2. The convertible pallet of claim 1 wherein the convertible support surface includes a hinge mounting assembly for selectively pivoting the convertible support surface relative to the support member.

3. The convertible pallet of claim 2 wherein the hinge mounting assembly includes a retaining member for holding the convertible support surface in one of the first and second positions.

4. The convertible pallet of claim 3 wherein the retaining member includes one of a threaded member or a biased member for tightening the convertible support surface to the planar support surface.

5. The convertible pallet of claim 1 wherein the convertible support surface includes first and second flanges hingedly mounted on opposite ends of the planar support member.

6. The convertible pallet of claim 5 wherein in the second position, the convertible support surface extends substantially perpendicular to the upper surface of the planar support member.

7. The convertible pallet of claim 6 wherein in the second position of the convertible support surface, the wheels extend outwardly from the planar support member a greater distance than the convertible support surface.

8. The convertible pallet of claim 1 wherein in the first position, the convertible support surface is disposed in substantially parallel relation with the upper surface of the planar support member.

9. The convertible pallet of claim 8 wherein in the first position, the convertible support surface is disposed beneath at least one of the wheels.

10. The convertible pallet of claim 9 wherein in the first position of the convertible support surface, the wheels are located between the convertible support surface and the planar support member.

11. The convertible pallet of claim 1 wherein the first and second wheels are located adjacent opposite edges of the support member, and further comprising a support structure extending outwardly from the support member between the first and second wheels.

* * * * *